United States Patent
Feng et al.

(10) Patent No.: US 12,429,138 B2
(45) Date of Patent: Sep. 30, 2025

(54) CONNECTION FOR VALVE SEAT AND VALVE BODY UNIT

(71) Applicant: ZHEJIANG DUNAN ARTIFICIAL ENVIRONMENT CO., LTD., Shaoxing (CN)

(72) Inventors: Zhongbo Feng, Shaoxing (CN); Ju Jin, Shaoxing (CN); Fugang Wang, Shaoxing (CN); Wenrong Zhang, Shaoxing (CN); Zhiguo Song, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 76 days.

(21) Appl. No.: 18/375,273

(22) Filed: Sep. 29, 2023

(65) Prior Publication Data
US 2024/0026978 A1    Jan. 25, 2024

Related U.S. Application Data

(63) Continuation of application No. PCT/CN2022/093883, filed on May 19, 2022.

(30) Foreign Application Priority Data

May 24, 2021    (CN) .......................... 202121122395.4

(51) Int. Cl.
*F16K 1/32*    (2006.01)
*F16K 27/02*    (2006.01)

(52) U.S. Cl.
CPC ................ *F16K 1/32* (2013.01); *F16K 27/02* (2013.01)

(58) Field of Classification Search
CPC . F16K 1/427; F16K 1/32; F16K 27/02; F16K 27/00; F16K 1/42; F16K 1/422
USPC ........................................................ 251/368
See application file for complete search history.

(56) References Cited

U.S. PATENT DOCUMENTS

| | | | | |
|---|---|---|---|---|
| 554,915 | A | * | 2/1896 | Dixon ....................... F16K 1/42 251/270 |
| 757,444 | A | * | 4/1904 | Entrek .................. B60B 35/025 301/132 |
| 1,457,318 | A | | 6/1923 | Shevlin |

(Continued)

FOREIGN PATENT DOCUMENTS

| | | |
|---|---|---|
| CN | 108662169 A | 10/2018 |
| CN | 109505911 A | 3/2019 |

(Continued)

OTHER PUBLICATIONS

European search report of EP22810456.8.
International Search Report of PCT/CN2022/093883.

*Primary Examiner* — Daphne M Barry

(57) ABSTRACT

A valve device is provided. The valve device includes a valve body unit, a mounting seat and a valve seat. The valve device further includes a fastening member. The mounting seat is provided with a limiting step, and a side surface of the valve seat is provided with a connecting hole in communication with the mounting hole along a direction perpendicular to an axis of the mounting hole. And an end of the fastening member extends into the mounting hole from the connecting hole and abuts against the limiting step.

13 Claims, 4 Drawing Sheets

(56) References Cited

U.S. PATENT DOCUMENTS

| | | | | |
|---|---|---|---|---|
| 2,610,820 | A * | 9/1952 | Markel | F16K 27/08 |
| | | | | 285/376 |
| 2,807,388 | A * | 9/1957 | Teeters | F16K 27/00 |
| | | | | 220/325 |
| 3,206,165 | A * | 9/1965 | Salmon | F16K 41/10 |
| | | | | 251/367 |
| 4,452,428 | A * | 6/1984 | Scaramucci | F16K 27/08 |
| | | | | 137/15.01 |
| 4,687,017 | A * | 8/1987 | Danko | F16J 15/04 |
| | | | | 251/63.5 |
| 5,253,671 | A * | 10/1993 | Kolenc | F16K 41/12 |
| | | | | 92/13.41 |
| 6,854,704 | B1 * | 2/2005 | Young | F16K 31/1268 |
| | | | | 251/291 |
| 8,777,178 | B2 * | 7/2014 | Young | F16K 31/1262 |
| | | | | 251/60 |
| 8,991,420 | B2 * | 3/2015 | Adams | F16K 37/0008 |
| | | | | 137/553 |
| 9,395,015 | B2 * | 7/2016 | Young | F16K 31/50 |
| 11,287,063 | B2 * | 3/2022 | Comalander | F16K 27/00 |
| 2003/0034465 | A1 * | 2/2003 | Adams | F16K 31/1262 |
| | | | | 251/14 |

FOREIGN PATENT DOCUMENTS

| | | |
|---|---|---|
| CN | 209294521 U | 8/2019 |
| CN | 215059861 U | 12/2021 |
| EP | 3270020 A1 | 1/2018 |
| JP | 2017194089 A | 10/2017 |
| JP | 2019056472 A | 4/2019 |

* cited by examiner

CONNECTION FOR VALVE SEAT AND VALVE BODY UNIT

CROSS-REFERENCE TO RELATED APPLICATIONS

This application is a continuation of international patent application No. PCT/CN2022/093883, filed on May 19, 2022, which itself claims priority to Chinese patent application No. 202121122395.4, filed on May 24, 2021, and titled "VALVE DEVICE". The contents of the above identified applications are hereby incorporated herein in their entireties by reference.

TECHNICAL FIELD

The present disclosure relates to the field of refrigeration, in particular, to a valve device.

BACKGROUND

A valve device is an important element in a refrigerating device, and mainly plays a role of throttling and depressurization. The valve device includes components such as a valve body unit, a sleeve pipe, a guiding sleeve, a valve rod assembly, a nut sleeve, a driving mechanism and the like. The sleeve pipe is disposed on the valve body unit. The valve body unit is provided with a valve port. The nut sleeve and the guiding sleeve are disposed on the valve body unit. The valve rod assembly is disposed in the guiding sleeve, and can move along the guide sleeve and the nut sleeve to open or close the valve port under the action of the driving mechanism, thereby achieving the aim of throttling and depressurization.

In the valve device of related art, a positional relationship between the valve seat and the valve body unit is limited via a limiting member. Generally, only movement of the valve body unit separating from the valve seat along the axis of the valve body unit can be limited by contact limitation of the limiting member. Thus, it cannot ensure that a position relationship between the valve seat and the valve body unit will not change, thereby affecting operation of the valve device.

SUMMARY

On the basis of embodiments of the present disclosure, the present disclosure provides a valve device that can simultaneously fix the valve seat and the valve body unit along an axis of the valve device and a radial direction of the valve device.

A technical solution of the present disclosure is shown hereinafter.

A valve device includes a valve body unit, a mounting seat and a valve seat. The valve seat is provided with a mounting hole. The mounting seat is disposed on the valve body unit. An end of the valve body unit adjacent to the mounting seat extends into the mounting hole, and the mounting seat is disposed in the mounting hole along with the valve body unit. The valve device further includes a fastening member. The mounting seat is provided with a limiting step, a side surface of the valve seat is provided with a connecting hole in communication with the mounting hole along a direction perpendicular to an axis of the mounting hole. An end of the fastening member extends into the mounting hole from the connecting hole and abuts against the limiting step.

In some embodiments, the step includes a first surface and a second surface. An angle between the first surface and the second surface is defined as A.

In some embodiments, the fastening member abuts against the first surface along an axis of the fastening member, and the fastening member matches with the second surface along a radial direction of the fastening member to limit the second surface.

In some embodiments, an end surface of the fastening member abuts against the first surface, and a periphery surface of the fastening member matches with the second surface to limit the second surface In some embodiments, the first surface intersects with the second surface, and the angle A between the first surface and the second surface is a right angle.

In some embodiments, the first surface is a plane and parallel to the axis of the mounting hole. In some embodiments, the second surface is a plane and perpendicular to the axis of the mounting hole.

In some embodiments, along the axis of the valve body unit, a height of the first surface is defined as $H_1$. Along a radial direction of the valve body unit, a maximum length of the second surface is defined as $H_2$, a diameter of the fastening member is defined as D. $H_1$, $H_2$ and D meet following formulas: $0.5D \leq H_1 \leq 2D$, $0.3D \leq H_2 \leq D$.

In some embodiments, the fastening member is a bolt or a screw.

In some embodiments, the number of the connecting hole is two, and the two connecting holes are disposed at intervals on a same side surface of the valve seat; and the number of the fastening member is the same as the number of the connecting hole.

In some embodiments, the number of the connecting hole is two, and the two connecting holes are disposed on different side surfaces of the valve seat. The mounting seat is provided with two limiting steps, and each of the two limiting steps is corresponding to one of the two connecting holes. The number of the fastening member is the same with the number of the connecting holes.

In some embodiments, the number of the limiting step is at least two, and the at least two limiting steps are disposed at intervals along a circumference of the mounting seat.

It could be understood that by providing four limiting steps at intervals along the circumference of the mounting seat, it is convenient for mounting and assembly between the valve body unit and the valve seat.

In some embodiments, the mounting seat is sleeved on the valve body unit and fixed to the valve body unit.

Details of one or more embodiments of the present disclosure are set forth in the accompanying drawings and description below. Other features, objects, and advantages of the present disclosure will become apparent from the specification, the accompanying drawings, and the claims.

BRIEF DESCRIPTION OF THE DRAWINGS

In order to better describe and illustrate those embodiments and/or examples of the invention disclosed herein, reference may be made to one or more of the accompanying drawings. The additional details or examples used to describe the accompanying drawings should not be considered a limitation on the scope of any of the disclosed inventions, the embodiments and/or examples presently described, and the best mode of these inventions as presently understood.

Figure 1:
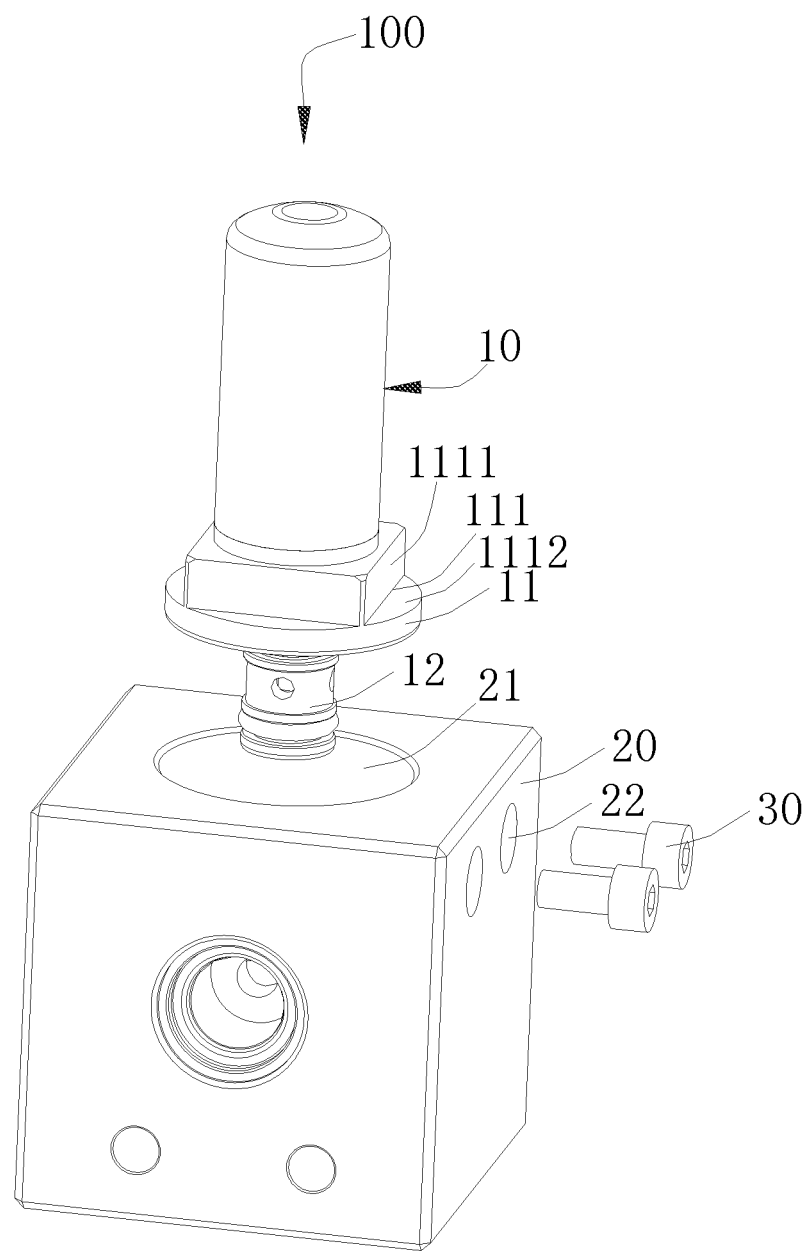
FIG. 1 is an exploded view of a valve device in some embodiments of the present disclosure.

In the figures, 100 represents a valve device; 10 represents a valve body unit; 11 represents a mounting seat; 111 represents a limiting step; 1111 represents a first surface; 1112 represents a second surface; 112 represents a through hole; 12 represents a valve body; 13 represents a valve needle assembly; 14 represents a sleeve pipe; 15 represents a valve port; 20 represents a valve seat; 21 represents a mounting hole; 22 represents a connecting hole; 30 represents a fastening member.

DETAILED DESCRIPTION

The technical solutions in the embodiments of the present disclosure will be clearly and completely described below in conjunction with the accompanying drawings in the embodiments of the present disclosure. Obviously, the described embodiments may be a part of the embodiments of the present disclosure, but not all of the embodiments. Based on the embodiments in the present disclosure, all other embodiments obtained by a person of ordinary skill in the art without making creative labor fall within the scope of protection of the present disclosure.

It should be noted that when a component is said to be "provided on" another component, it may be provided directly on the other component or there may be a centered component. When a component is said to be "disposed on" another component, it may be provided directly on the other component or there may be both centered components. When a component is considered to be "fixed to" another component, it may be fixed directly to the other component or there may be both centered components.

Unless otherwise defined, all technical and scientific terms used herein have the same meaning as commonly understood by those skilled in the art of this disclosure. Terms used herein in the specification of this disclosure are used only for the purpose of describing specific embodiments and are not intended to limit this disclosure. The term "or/and" as used herein includes any and all combinations of one or more related listed items.

Referring to FIG. 1 to FIG. 7, the present disclosure provides a valve device 100. The valve device is used in a refrigeration system of an air condition, to adjust a flow rate and a pressure of the fluid medium.

Specifically, the valve device 100 includes a valve body unit 10, a mounting seat 11 and a valve seat 20. The valve seat 20 is provided with a mounting hole 21. The mounting seat 11 is disposed on the valve body unit 10. An end of the valve body unit 10 adjacent to the mounting seat 11 extends into the mounting hole 21, and the mounting seat 11 is disposed in the mounting hole 21 along with the valve body unit 10. The valve device further includes a fastening member 30. The mounting seat 11 is provided with a limiting step 111, a side surface of the valve seat 20 is provided with a connecting hole 22 in communication with the mounting hole 21 along a direction perpendicular to an axis of the mounting hole 21. An end of the fastening member 30 extends into the mounting hole 21 from the connecting hole 22 and abuts against the limiting step 111.

It should be noted that, in the valve device of related art, a positional relationship between the valve seat and the valve body unit is limited via a limiting member. Generally, only movement of the valve body unit separating from the valve seat along the axis of the valve body unit can be limited by contact limitation of the limiting member. Thus, it cannot ensure that a position relationship between the valve seat and the valve body unit will not change, thereby affecting operation of the valve device. In the present embodiment, by providing the limiting step 111, the fastening member 30 abuts against the limiting step 111 along the axis of the valve body unit 10 and the radial direction of the valve body unit 10. Thus, the valve body unit 10 cannot rotate relative to the valve seat 20, and cannot move up and down relative to the axis of the valve seat 20, thereby realizing simultaneously fixing the valve seta 20 and the valve body unit 10 along the axis of the valve body unit 10 and the circumference direction of the valve body unit 10. Not only the positioning is stable, but also the assembly effect is better, and an operation stability of the valve device 100 is better.

Figure 5:
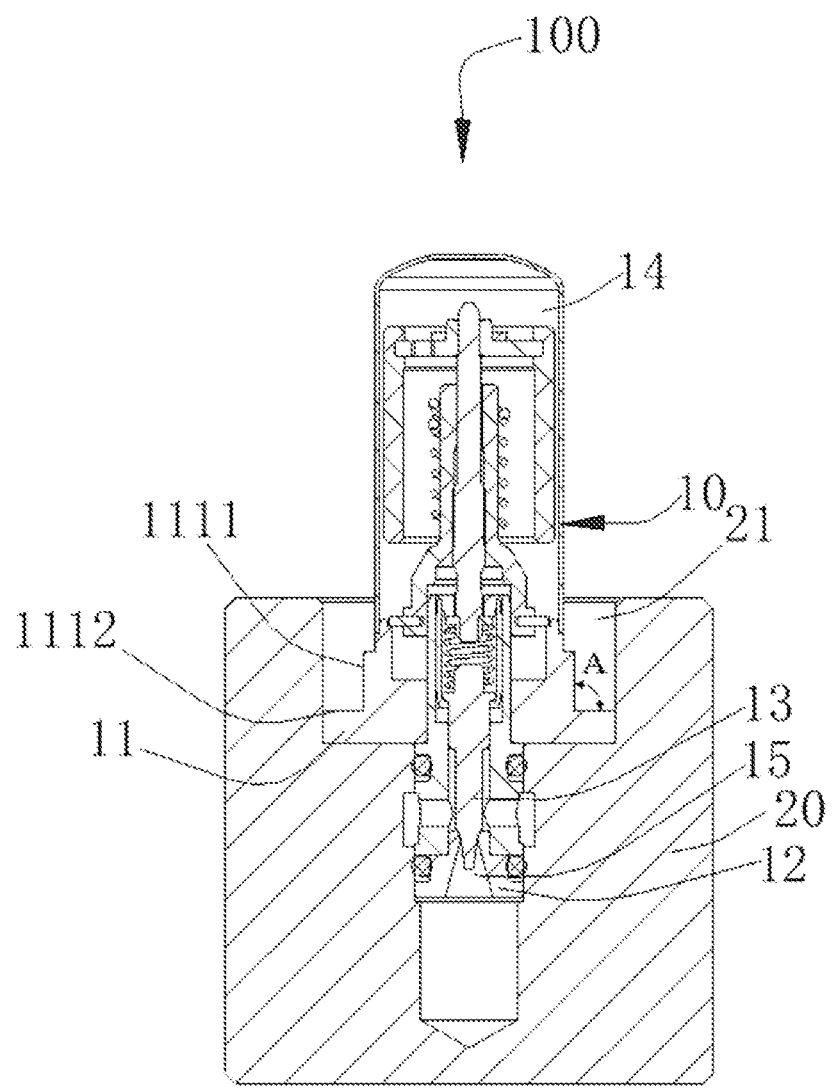
FIG. 5 is a sectional view of a valve device from an angel of view in some embodiments of the present disclosure.
Figure 6:
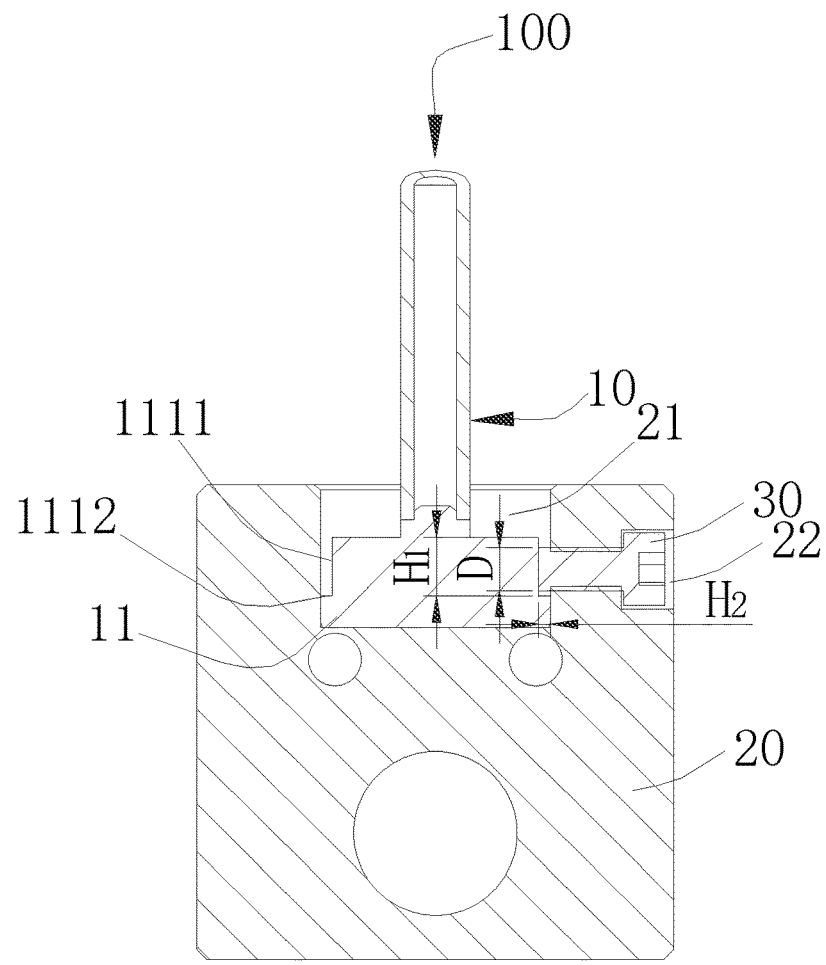
FIG. 6 is a sectional view of a valve device from another angel of view in some embodiments of the present disclosure.
Figure 7:
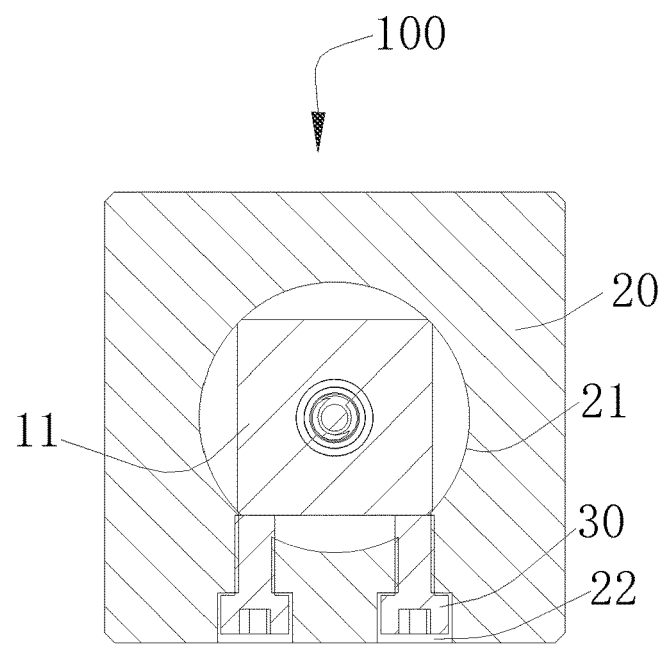
FIG. 7 is a sectional view of a valve device from another angel of view in some embodiments of the present disclosure.

Referring to FIG. 1 and FIG. 5, the valve body unit 10 includes a valve body 12, a valve needle assembly 13 and a sleeve pipe 14. The valve body 12 is provided with a valve port 15. The valve needle assembly 13 is disposed on the valve body 12, and capable of moving relative to the valve body 12 to open or close the valve port 15. An end of the sleeve pipe 14 is covered on the valve body 12, and an end of the valve needle assembly 13 away from the valve body 12 extends into the sleeve pipe 14.

It could be understood that except for the above components, the valve body unit 10 further includes components such as a stator, a rotator, a nut sleeve and the like. The components match with each other to drive the valve needle assembly 13 to move and adjust an opening degree of the valve port 15. Of course, mounting of the above components are known in the field, which are not repeated herein.

Figure 2:
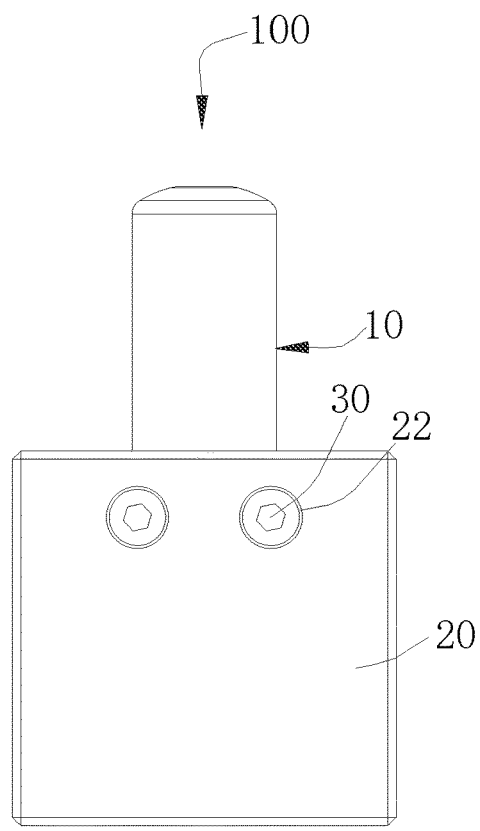
FIG. 2 is an assembly structural schematic diagram of a valve device in some embodiments of the present disclosure.
Figure 3:
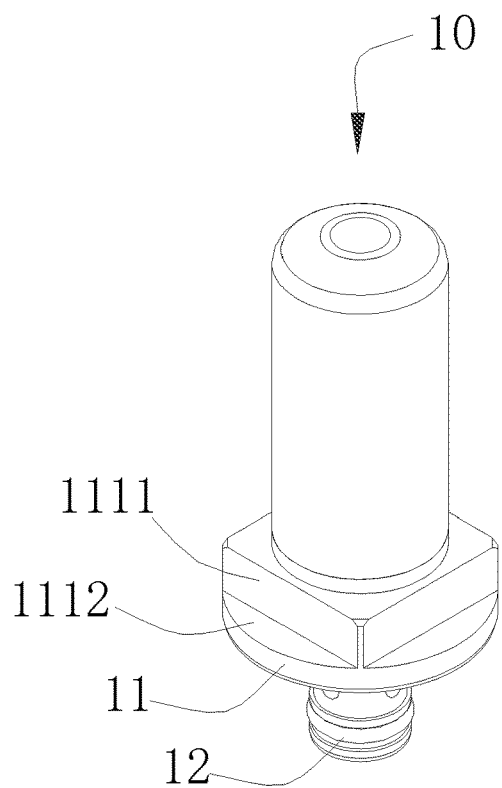
FIG. 3 is a structural schematic diagram of a valve body unit in some embodiments of the present disclosure.
Figure 4:
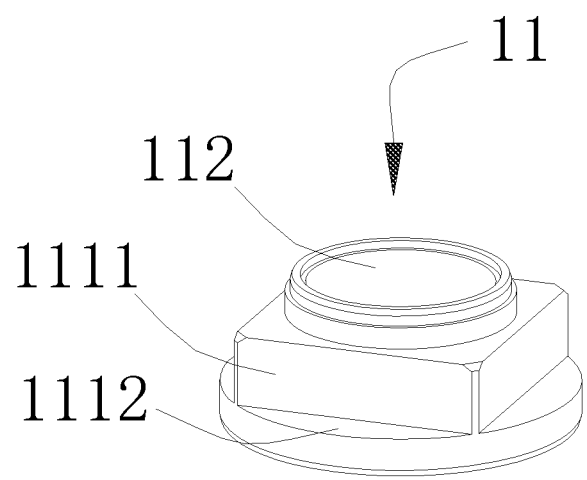
FIG. 4 is a structural schematic diagram of a mounting seat in some embodiments of the present disclosure.

Referring to FIG. 1 to FIG. 3, the mounting seat 11 is sleeved on the valve body 12 and fixed to the valve body 12, so that the valve body 12 is mounted to the mounting seat, thereby avoiding the mounting seat 11 from falling from the valve body 12 and influencing normal operation of the valve device 100. Of course, in some embodiments, the mounting seat 11 can be connected to the valve body 12 by methods of threaded connection, welding, and the like.

In some embodiments, the mounting seat 11 is provided with a through hole 112. An end of the valve body 12 extends through the through hole 112 and fixed to the through hole 112.

Referring to FIG. 4 to FIG. 7, the limiting step 111 includes a first surface 1111 and a second surface 1112. An end surface of the fastening member 30 abuts against the first surface 1111, a periphery surface of the fastening member 30 matches with the second surface 1112 to limit the second surface 1112. When the valve body unit 10 rotates relative to the valve seat 20, the end surface of the fastening member 30 abuts against the first surface 1111 and plays a role of limiting, so that the valve body unit 10 cannot rotate relative to the valve seat 20. When the valve body unit 10 moves up and down relative to the valve seat 20, the periphery surface of the fastening member 30 abuts against the second surface 1112, so that the valve body unit 10 cannot move up and down relative to the valve seat 20. Thus, the valve seat 20 and the valve body 10 can be simultaneously fixed along the axis of the valve body unit 10 and a circumference of the valve body unit 10.

In some embodiments, the first surface 1111 can be any one of a plane or a curved surface, and the second surface 1112 can be any one of a plane or a curved surface. Specifically, in the present embodiment, the first surface 1111 can be a plane, and the second surface 1112 can be a plane. It could be understood that a plane is not only convenient for manufacturing and producing, but also has a larger contact surface when the plane abuts against the fastening member 30. That is, stabilities of abutting between the first surface 1111 and the fastening member 30 and the second surface 1112 and the fastening member 30 can be better.

Furthermore, the first surface 1111 intersects with the second surface 1112, and an angle between the first surface 1111 and the second surface 1112 is defined as A. The angle A defined between the first surface 1111 and the second surface 1112 is in a range of 30 degrees and 160 degrees. It could be understood that the angle A should not be unduly small or great. When the angle A is unduly small, the end surface of the fastening member 30 extending into the mounting hole 21 is not convenient for the first surface 1111 to abut against. When the angle A is unduly great, a route of the fastening member 30 extending into the mounting hole 21 becomes longer, and a contact surface between the fastening member 30 and the first surface 1111 is small, so that the stability of abutting between the fastening member 30 and the first surface 1111 is worse.

Optionally, in the present embodiment, the first surface 1111 intersects with the second surface 1112, and the angle A defined between the first surface 1111 and the second surface 1112 is a right angle. The first surface 1111 is parallel to the axis of the valve body unit 10, the second surface 1112 is perpendicular to the axis of the valve body unit 10, and the axis of the connecting hole 22 is perpendicular to the axis of the valve body unit 10. Thus, the end surface of the fastening member 30 abuts against the first surface 1111 by methods of surface contact, and the periphery surface of the fastening member 30 abuts against and attaches with the second surface 1111, so that the abutting between the periphery surface of the fastening member 30 and first surface 1111 and the periphery surface of the fastening member 30 and the second surface 1112 can be more stable, thereby further improving the reliability of the limitation of the valve body unit 10.

It could be understood that since the first surface 1111 intersects with the second surface 1112 and the angle A defined between the first surface 1111 and the second surface 1112 is a right angle, the first surface 1111 and the second surface 1112 can better attach with the end surface of the fastening member 30 and the periphery surface of the fastening member 30, thereby further improving fixing performance between the valve body unit 10 and the valve seat 20.

Furthermore, along the axis of the valve body unit 10, a height of the first surface 1111 is defined as $H_1$. Along a radial direction of the valve body unit 10, a maximum length of the second surface 1112 is defined as $H_2$, a diameter of the fastening member is defined as D. $H_1$, $H_2$ and D meet following formulas: $0.5D \leq H_1 \leq 2D$, $0.3D \leq H_2 \leq D$. Therefore, the fixing performance between the valve body unit 10 and the valve seat 20 when the fastening member 30 abuts against the limiting step 111 can be further improved, ensuring reliability of limitation of the valve seat 20 along the axis of the valve body unit 10 and along the circumference of the valve body unit 10.

It should be noted that if the height $H_1$ of the first surface 1111 and the maximum length $H_2$ of the second surface 1112 is unduly small, a stressed area of the fastening member 30 when abutting against the first surface 1111 and the second surface 1112 is unduly small. Thus, the fastening member 30 may easily separate from the limiting step 111, thereby leading to failure of limitation and influencing operation of the valve device 100. If the height $H_1$ of the first surface 1111 and the maximum length $H_2$ of the second surface 1112 is unduly great, it may be more difficult to provide a limiting step 111 on the mounting seat 11, waste the material and increase a processing cost.

Generally, the maximum length of the second surface 1112 should be limited on the basis of a total length of the fastening member 30. In the present disclosure, since the diameter of the fastening member 30 affects a shear force, the maximum length of the second surface 1112 is limited on the basis of the diameter of the fastening member 30. That is, since the maximum length $H_2$ of the second surface 1112 mainly affects the fixing performance of the fastening member 30 along the axis of the valve body unit 10, the greater the diameter of the fastening member 30 is, the greater is the shear force required to bend the fastening member 30. Thus, in the present disclosure, the maximum length $H_2$ of the second surface should be limited by the diameter D of the fastening member 30.

In some embodiments, the number of the limiting step 111 is four, and the four limiting steps 111 are disposed at intervals along the circumference of the mounting seat 11 and disposed at four directions of the mounting seat 11, respectively. Thus, the fastening member 30 can abut against any one of the four limiting steps 111. That is, the valve body unit 10 can be mounted from a plurality of angles, and mounting of the valve body unit 10 can be more convenient.

Optionally, in order to improve reliability of limitation of the valve body 10, the number of the fastening member 30 is the same as the number of the limiting step 111. That is, the number of the fastening member 30 is four, and the four fastening members 30 are disposed on four surfaces of the valve seat 20, the four fastening member 30 simultaneously extends into the mounting hole 21 from four different directions and abuts against a corresponding limiting step 111, respectively.

In some embodiments, the number of the connecting hole 22 is two. The two connecting holes 22 are disposed at intervals on a same side surface of the valve seat 20; and the number of the fastening member 30 is the same as the number of the connecting hole 22. That is, the number of the fastening member 30 is two, the two fastening member 30 extends into the mounting hole 21 from a corresponding connecting hole 22, respectively, and abuts against the same limiting step 111. That is, the number of the limiting step 111 is one.

In some embodiments, the number of the connecting hole 22 is two, and the two connecting holes 22 are disposed on different side surfaces of the valve seat 20. The mounting seat 11 is provided with two limiting steps 111, and each of the two limiting steps is corresponding to one of the two connecting holes 22. The number of the fastening member 30 is the same with the number of the connecting holes 22. The two fastening members 30 extends into the mounting hole 21 from the connecting holes 22 disposed on different side surfaces of the valve seat 20 and abuts against different limiting steps 111.

In some embodiments, the two connecting holes 22 can be located on two adjacent side surfaces of the valve seat 20, or can be located on two opposite side surfaces of the valve seat 20. At the same time, the limiting step 111 can be correspondingly located on the mounting seat 11.

Optionally, the fastening member 30 can be a bolt or a screw. That is, the fastening member 30 can be connected to the valve seat 20 by threaded connection. By threaded connection, the structure is not only simple, but also easy to be assembled and disassembled, thereby facilitating checking and maintaining the structure.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims. The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A valve device, comprising a valve body unit, a mounting seat and a valve seat, wherein the valve seat is provided with a mounting hole, the mounting seat is disposed on the valve body unit, an end of the valve body unit adjacent to the mounting seat extends into the mounting hole, and the mounting seat is disposed in the mounting hole along with the valve body unit;

the valve device further comprises a fastening member, the mounting seat is provided with four limiting steps, each of the four limiting steps comprises a first surface and a second surface, an angle between the first surface of each of the four limiting steps and a corresponding second surface is defined as A, and the angle A between the first surface of each of the four limiting steps and the corresponding second surface is a right angle, the first surface of each of the four limiting steps is a plane and parallel to the axis of the mounting hole, a side surface of the valve seat is provided with a connecting hole in communication with the mounting hole along a direction perpendicular to an axis of the mounting hole, and an end of the fastening member extends into the mounting hole from the connecting hole and abuts against the first surface of each of the four limiting steps.

2. The valve device of claim 1, wherein the fastening member abuts against the first surface of one of the four limiting steps along an axis of the fastening member, and the fastening member matches with the second surface of one of the four limiting steps along a radial direction of the fastening member to limit the corresponding second surface.

3. The valve device of claim 2, wherein an end surface of the fastening member abuts against the first surface of each of the four limiting steps, and a periphery surface of the fastening member matches with the corresponding second surface to limit the corresponding second surface.

4. The valve device of claim 1, wherein
the second surface of each of the four limiting steps is a plane and perpendicular to the axis of the mounting hole.

5. The valve device of claim 1, wherein along an axis of the valve body unit, a height of the first surface of each of the four limiting steps is defined as $H_1$, along a radial direction of the valve body unit, a maximum length of the second surface of each of the four limiting steps is defined as $H_2$, a diameter of the fastening member is defined as D, and $H_1$, $H_2$ and D meet following formulas:

$$0.5D \leq H_1 \leq 2D, 0.3D \leq H_2 \leq D.$$

6. The valve device of claim 1, wherein the fastening member is connected to the valve seat by threaded connection.

7. The valve device of claim 1, wherein the number of the connecting hole is two, and the two connecting holes are disposed at intervals on a same side surface of the valve seat; and
the number of the fastening member is the same as the number of the connecting hole.

8. The valve device of claim 7, wherein the two fastening members extend through the two corresponding connecting holes, respectively, and abut against same one of the four limiting steps.

9. The valve device of claim 1, wherein the number of the connecting hole is two, and the two connecting holes are disposed on different side surfaces of the valve seat;
two of the four limiting steps are corresponding to the two connecting holes, respectively; and,
the number of the fastening member is the same with the number of the connecting holes.

10. The valve device of claim 9, wherein the two fastening members extend through the two connecting holes disposed on two side surfaces of the valve seat and abut against two of the four limiting steps.

11. The valve device of claim 1, wherein the four limiting steps are disposed at intervals along a circumference of the mounting seat.

12. The valve device of claim 1, wherein the mounting seat is sleeved on the valve body unit and fixed to the valve body unit.

13. The valve device of claim 1, wherein the first surfaces of adjacent two of the four limiting steps are perpendicular to each other.

* * * * *